United States Patent
Hanson et al.

(10) Patent No.: US 12,010,114 B2
(45) Date of Patent: Jun. 11, 2024

(54) DELAYED BIOMETRIC AUTHORIZATION

(71) Applicant: Ford Global Technologies, LLC, Dearborn, MI (US)

(72) Inventors: Ryan Edwin Hanson, Livonia, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 17/713,321

(22) Filed: Apr. 5, 2022

(65) Prior Publication Data

US 2023/0319033 A1    Oct. 5, 2023

(51) Int. Cl.
*H04L 9/40* (2022.01)

(52) U.S. Cl.
CPC ........ *H04L 63/0861* (2013.01); *H04L 63/108* (2013.01)

(58) Field of Classification Search
CPC .......................... H04L 63/0861; H04L 63/108
See application file for complete search history.

(56) References Cited

U.S. PATENT DOCUMENTS

| | | | |
|---|---|---|---|
| 8,344,849 B2 | 1/2013 | Larsson et al. | |
| 10,384,648 B1 | 8/2019 | Chapin | |
| 2013/0055348 A1* | 2/2013 | Strauss | G06F 21/31 726/3 |
| 2015/0172264 A1* | 6/2015 | Hardy | H04W 4/80 726/4 |
| 2019/0342298 A1* | 11/2019 | Chen | H04L 9/3231 |
| 2020/0108795 A1 | 4/2020 | Chapin | |
| 2020/0120094 A1* | 4/2020 | Jain | G06F 21/32 |
| 2020/0160633 A1 | 5/2020 | Zhang et al. | |

FOREIGN PATENT DOCUMENTS

DE            10048394 B4       4/2004

* cited by examiner

*Primary Examiner* — Robert B Leung
(74) *Attorney, Agent, or Firm* — Frank Lollo; Bejin Bieneman PLC (57) ABSTRACT

Upon determining a first user of an object is authorized via first biometric data, object components are controlled based on user data for the first user. A second user is permitted to access the object based on detecting a presence of the second user within a predetermined time of detecting an absence of the first user. Then, upon determining a delay parameter is satisfied, a user status of the second user is determined via second biometric data. The user status is one of authorized or not authorized. The object components are controlled based on the user status of the second user.

20 Claims, 4 Drawing Sheets

DELAYED BIOMETRIC AUTHORIZATION

BACKGROUND

A computer performing biometric authorization can receive sensor data to determine an identity of a person seeking authorization for access to be granted by the computer. Biometric authorization can include, for example, facial recognition, a type of biometric authorization where an image of a human face is used to identify a person. Biometric authorization can rely upon acquiring accurate biometric data.

DETAILED DESCRIPTION

Biometric authorization can be used by a computer to control access to devices, objects, and/or applications, e.g., to vehicles, buildings, computers, cell phones, other devices, etc. For example, biometric authorization can be implemented to permit authorized people to access, e.g., to a vehicle or building, and to deny access to unauthorized people. Biometric authorization may require that a user provide one or more types of biometric data and/or to provide the biometric data in a specific manner, e.g., in a specified sequence, to a specified sensor, etc., to generate user data that can be used to determine authorization. Biometric data is data representing measurements of physiological characteristics. A type of biometric data is data representing a specific physiological characteristic, e.g., distances between ridges in a fingerprint, distances between facial features, etc. Biometric authorization can authorize users by comparing the biometric data provided by the user to biometric data subsequently obtained via sensors in the vehicle, building, computing device, etc.

The results of performing the biometric authorization can be downloaded to a device granting or denying authorization and permission to access an object, for example, a device, a vehicle, a building, a room, a gated area, etc. Successful authorization can be used for security applications such as access to a location, e.g., a passenger cabin of a vehicle, a room, a building, etc., by unlocking a door. In other examples, successful authorization can be used to enable vehicle or building controls, or yet further alternatively or additionally access to a device such as a computer by enabling input devices, like a keyboard or mouse, or granting access to computer files.

Authorizing users for vehicles will be described herein as a non-limiting example of biometric authorization. That is, a vehicle will be described herein as a non-limiting example of an object. It is to be understood that other types of objects, e.g., a device, a building, a garage, a gated area, etc., could utilize the techniques described herein for biometric authorization.

Vehicles can be equipped with computing devices, networks, sensors, and controllers to acquire and/or process data regarding the environment and to permit access to the vehicle based on the data. For example, a camera in a vehicle can be programmed to acquire an image of an approaching user and, upon determining the user is authorized based on biometric authorization, e.g., via facial recognition software, a computer in the vehicle can unlock a door to permit the user to enter a passenger cabin of the vehicle. Likewise, cameras included in the passenger cabin of the vehicle can acquire one or more images of a user and, upon determining the user is authorized based on biometric authorization, e.g., via facial recognition software, the computer can accept commands from the user to operate the vehicle.

Conversely, upon determining the user is not authorized, the computer can prevent the user from accessing the vehicle and/or ignore commands from the user to operate the vehicle. That is, the computer may prevent an unauthorized user from operating the vehicle regardless of the circumstances of the unauthorized user's attempted use of the vehicle. Advantageously, upon detecting an authorized first user departing the vehicle and a second user entering the vehicle shortly thereafter, e.g., within a predetermined time, the computer can delay authorizing the second user until a delay parameter is satisfied. Once the delay parameter is satisfied, the computer can determine a user status for the second user based on authorizing the second user via biometric data for the second user. The computer can then control the vehicle based on the user status for the second user. Delaying authorization of the second user allows the computer to continue to operate the vehicle prior to the delay parameter being satisfied, which can decrease the likelihood of vehicle operation being delayed while determining whether the second user is authorized.

A system, comprising a computer including a processor and a memory, the memory storing instructions executable by the processor to, upon determining a first user of an object is authorized via first biometric data, control object components based on user data for the first user. The instructions further include instructions to permit a second user to access the object based on detecting a presence of the second user within a predetermined time of detecting an absence of the first user. The instructions further include instructions to then, upon determining a delay parameter is satisfied, determine a user status of the second user via second biometric data. The user status is one of authorized or not authorized. The instructions further include instructions to control the object components based on the user status of the second user.

The instructions can further include instructions to, upon determining the delay parameter is not satisfied, control the object components based on temporary user data.

The instructions can further include instructions to, upon determining that the second user is not authorized, stop controlling the object components based on the temporary user data.

The instructions can further include instructions to, upon determining that the second user is authorized, control the object components based on user data for the second user.

The instructions can further include instructions to, upon determining that the second user is not authorized, prevent operation of the object components.

The instructions can further include instructions to, upon determining that the second user is not authorized, provide, to a remote computer, a current location of the object and a location of the object when the second user accessed to the object.

The instructions can further include instructions to, upon determining that the second user is not authorized, control the object components based on unauthorized user data.

The instructions can further include instructions to, upon detecting the first user after determining the delay parameter is satisfied, control the object components based on the user data for the first user when the user status for the second user is not authorized.

The instructions can further include instructions to determine that the delay parameter is satisfied based on expiration of a timer.

The instructions can further include instructions to determine that the delay parameter is satisfied based on determining a distance from a current location of the object to a location of the object when the second user was permitted access to the object exceeds a threshold.

The instructions can further include instructions to, upon detecting the presence of the second user after the predetermined time, ignore the delay parameter and determine the user status of the second user via the second biometric data.

The instructions can further include instructions to, upon determining that the user status for the second user is authorized, permit the second user to access the object.

The instructions can further include instructions to control the object components based on user data for the second user.

The instructions can further include instructions to determine that the first user is authorized based on a confidence score for the first biometric data being greater than or equal to a confidence threshold.

The instructions can further include instructions to determine that the second user is authorized based on a confidence score for the second biometric data being greater than or equal to a confidence threshold.

A method includes, upon determining a first user of an object is authorized via first biometric data, controlling object components based on user data for the first user. The method further includes permitting a second user to access the object based on detecting a presence of the second user within a predetermined time of detecting an absence of the first user. The method further includes then, upon determining a delay parameter is satisfied, determining a user status of the second user via second biometric data. The user status is one of authorized or not authorized. The method further includes controlling the object components based on the user status of the second user.

The method can further include, upon determining the delay parameter is not satisfied, controlling the object components based on temporary user data.

The method can further include, upon determining that the second user is not authorized, stopping control of the object components based on the temporary user data.

The method can further include determining that the delay parameter is satisfied based on expiration of a timer.

The method can further include determining that the delay parameter is satisfied based on determining a distance from a current location of the object to a location of the object when the second user was permitted access to the object exceeds a threshold.

Further disclosed herein is a computing device programmed to execute any of the above method steps. Yet further disclosed herein is a computer program product, including a computer readable medium storing instructions executable by a computer processor, to execute an of the above method steps.

Figure 1:
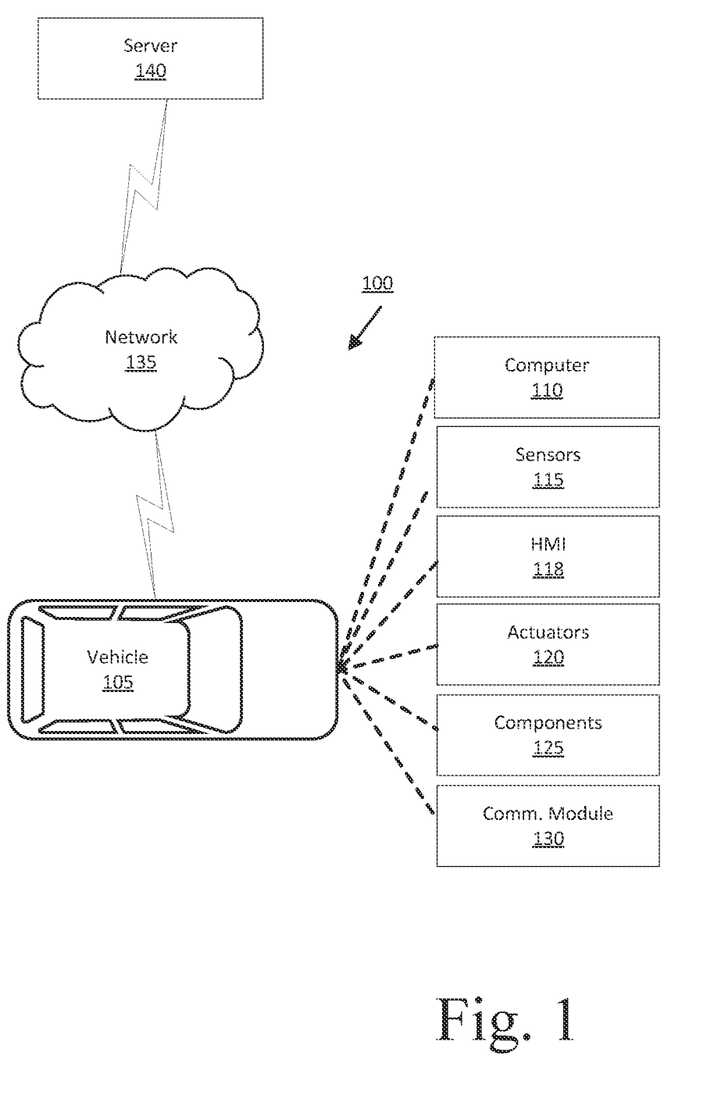
FIG. 1 is a block diagram illustrating an example control system for a vehicle.
Figure 2:
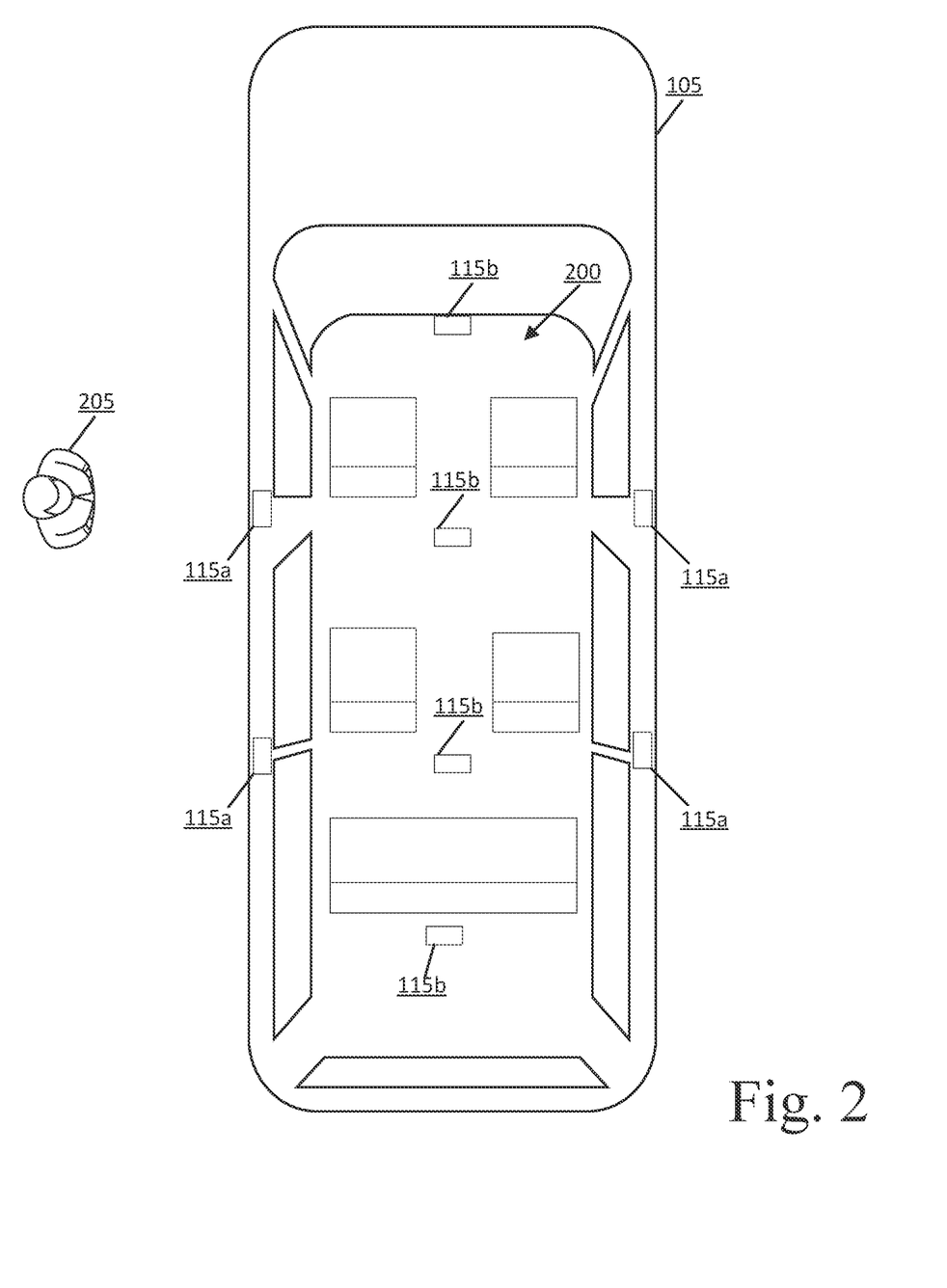
FIG. 2 is a diagram illustrating an exemplary passenger cabin of the vehicle.
Figure 3:
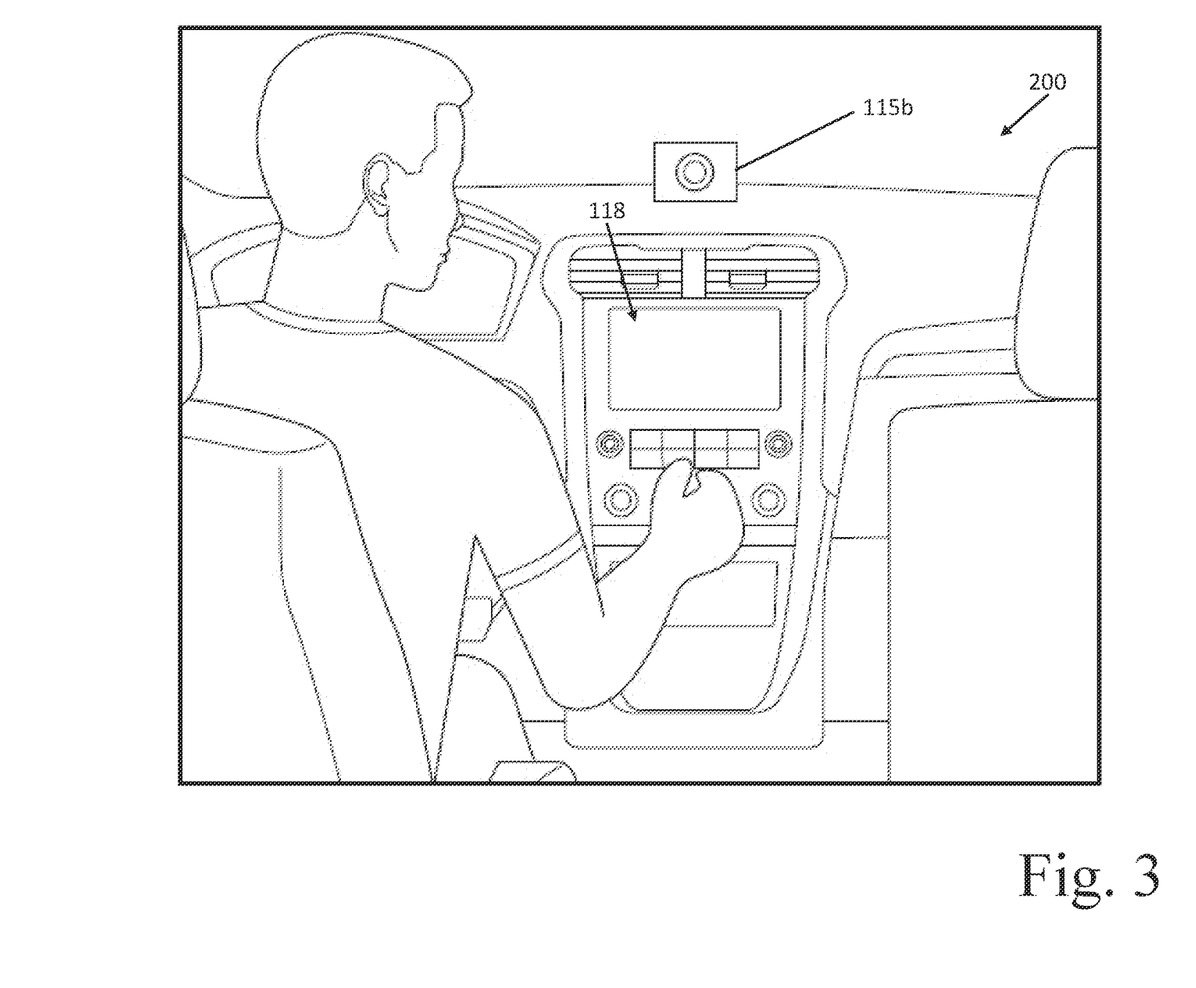
FIG. 3 is a diagram illustrating a user in the exemplary passenger cabin of the vehicle.

With reference to FIGS. 1-3, an example control system 100 includes a vehicle 105. A vehicle computer 110 in the vehicle 105 receives data from sensors 115. The vehicle computer 110 is programmed to, upon determining a first user of the vehicle 105 is authorized via first biometric data, control vehicle components 125 based on user data for the first user. The vehicle computer 110 is further programmed to permit a second user to access the vehicle 105 based on detecting a presence of the second user within a predetermined time of detecting an absence of the first user. The vehicle computer 110 is further programmed to then, upon determining a delay parameter is satisfied, determine a user status of the second user via second biometric data. The user status is one of authorized or not authorized. The vehicle computer 110 is further programmed to control the vehicle components 125 based on the user status of the second user.

Turning now to FIG. 1, the vehicle 105 includes the vehicle computer 110, sensors 115, actuators 120 to actuate various vehicle components 125, and a vehicle 105 communication module 130. The communication module 130 allows the vehicle computer 110 to communicate with remote computers 140, and/or other vehicles, e.g., via a messaging or broadcast protocol such as Dedicated Short Range Communications (DSRC), cellular, Wi-Fi, Ultra-Wideband (UWB), Bluetooth®, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above and/or may include a dedicated electronic circuit including an ASIC (Application Specific Integrated Circuit) that is manufactured for a particular operation, e.g., an ASIC for processing sensor 115 data and/or communicating the sensor 115 data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communication network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, actuators 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor 115(*s*), etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g., front view, side view, etc., providing images from an area surrounding the vehicle 105. As another example, the vehicle 105 can include one or more sensors 115, e.g., camera sensors 115, mounted inside a cabin of the vehicle 105 and oriented to capture images of users in the vehicle 105 cabin. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115, e.g., substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS) and/or dead reckoning. Additionally, or alternatively, the data can include a location of an object, e.g., a vehicle 105, a sign, a tree, etc., relative to the vehicle 105. As one example, the data may be image data of the environment around the vehicle 105. In such an example, the image data may include one or more objects and/or markings, e.g., lane markings, on or along a road. As another example, the data may be image data of the vehicle 105 cabin, e.g., including users and seats in the vehicle 105 cabin. Image data herein means digital image data, i.e., comprising pixels, typically with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle 105 subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The vehicle 105 further includes a human-machine interface (HMI) 118. The HMI 118 includes user input devices such as knobs, buttons, switches, pedals, levers, touchscreens, gesture detection sensors, and/or microphones, etc. The input devices may include sensors 115 to detect a user input and provide user input data to the vehicle computer 110. That is, the vehicle computer 110 may be programmed to receive user input from the HMI 118. The user may provide the user input via the HMI 118, e.g., by selecting a virtual button on a touchscreen display, by providing voice commands, etc. For example, a touchscreen display included in an HMI 118 may include sensors 115 to detect that a user selected a virtual button on the touchscreen display to, e.g., select or deselect an operation, which input can be received in the vehicle computer 110 and used to determine the selection of the user input.

The HMI 118 typically further includes output devices such as displays (including touchscreen displays), speakers, and/or lights, etc., that output signals or data to the user. The HMI 118 is coupled to the vehicle communication network and can send and/or receive messages to/from the vehicle computer 110 and other vehicle sub-systems.

In addition, the vehicle computer 110 may be configured for communicating via a vehicle-to-vehicle communication module or interface with devices outside of the vehicle 105, e.g., through a vehicle-to-vehicle (V2V) or vehicle-to-infrastructure (V2X) wireless communications (cellular and/or DSRC., etc.) to another vehicle, and/or to a remote server computer 140 (typically via direct radio frequency communications). The communication module could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module include cellular, Bluetooth®, IEEE 802.11, Ultra-Wideband (UWB), Near Field Communication (NFC), dedicated short range communications (DSRC), and/or wide area networks (WAN), including the Internet, providing data communication services.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 135 include wireless communication networks (e.g., using Bluetooth®, Bluetooth® Low Energy (BLE), UWB, NFC, IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or some other wide area network.

FIG. 2 is a diagram of a top view of an example passenger cabin 200 of an example vehicle 105. The vehicle 105 may include a body (not numbered) defining the passenger cabin 200 to house occupants, if any, of the vehicle. The body includes doors and windows that can be opened, e.g., to allow ingress and egress from the passenger cabin 200.

The passenger cabin 200 may extend across the vehicle 105, i.e., from one side to the other side of the vehicle 105. The passenger cabin 200 includes a front end (not numbered) and a rear end (not numbered) with the front end being in front of the rear end during forward movement of the vehicle 105. The passenger cabin 200 includes one or more seats (not numbered). The seats may be arranged in any suitable arrangement. For example, the passenger cabin 200 may include one or more front seats disposed at a front of the passenger cabin 200 and one or more back seats disposed behind the front seats. The passenger cabin 200 may also include third-row seats at the rear of the passenger cabin 200. In FIG. 2, the front seats and back seats are shown to be bucket seats and the third-row seats are shown to be bench seats, but the seats may be other types.

The vehicle 105 may include any suitable number of sensors 115, e.g., one or more. For example, as illustrated in FIG. 2, the vehicle 105 may include a plurality of external sensors 115a that are positioned to monitor an environment around the vehicle 105, and a plurality of internal sensors 115b that are positioned to monitor the passenger cabin 200 of the vehicle 105.

The vehicle computer 110 may be programmed to authenticate a first user. Authenticating the first user means validating or proving the identity of the first user; a failure to authenticate occurs upon a determination that the first user's identity cannot be validated, i.e., proved. If the vehicle computer 110 determines to authenticate the first user, then the vehicle computer 110 can allow the first user to initiate biometric enrollment, e.g., by providing virtual buttons or the like on the HMI 118 to initiate biometric enrollment (as discussed below). If the vehicle computer 110 determines to not authenticate the first user, then the vehicle computer 110 can prevent the first user from initiating biometric enrollment, e.g., by disabling (or removing) the virtual buttons on the HMI 118 to initiate biometric enrollment.

The vehicle computer 110 can, for example, authenticate the first user based on receiving a first user input specifying identifying information for the first user, e.g., a username and a password. In such an example, the vehicle computer 110 can actuate the HMI 118 to display virtual buttons corresponding to alphanumeric characters that the first user can select to provide the identifying information. In other words, the HMI 118 may activate sensors that can detect the first user selecting virtual buttons to specify the first user's identifying information. Upon detecting the first user input, the HMI 118 can provide the first user input to the vehicle computer 110, and the vehicle computer 110 can authenticate the first user based on the first user input. For example, the vehicle computer 110 can compare the identifying information specified by the first user input to identifying information stored, e.g., in a memory of the vehicle computer 110. If the retrieved identifying information matches the stored identifying information, then the vehicle computer 110 determines to authenticate the first user. In this context, "match" means retrieved identifying information identifies a same user as stored identifying information. If the retrieved identifying information does not match the stored identifying information, then the vehicle computer 110 determines to not authenticate the first user. Additionally, or alternatively, the vehicle computer 110 can authenticate the first user based on detecting a device, e.g., paired with the HMI 118, associated with an authenticated user in a memory of the vehicle computer 110.

Upon authenticating the first user, the vehicle computer 110 may be programmed to initiate biometric enrollment for the first user based on receiving a second user input. For example, the vehicle computer 110 can actuate the HMI 118 to display virtual buttons or the like that the first user can select to initiate biometric enrollment. In other words, the HMI 118 may activate sensors that can detect the first user selecting the virtual button to initiate biometric enrollment. Upon detecting the second user input, the HMI 118 can provide the second user input to the vehicle computer 110, and the vehicle computer 110 can initiate biometric enrollment based on the second user input.

Biometric enrollment in this document means generating user data based on obtaining enrollment, i.e., baseline, biometric data for a given user. During biometric enrollment, the vehicle computer 110 generates user data for the first user. For example, the vehicle computer 110 can maintain a look-up table or the like, e.g., stored in the memory of the vehicle computer 110, that associates the first user with the corresponding biometric data. Upon determining to initiate biometric enrollment, the vehicle computer 110 can update the look-up table to associate the first user with the initial enrollment biometric data. The vehicle computer 110 can control vehicle 105 operation based on the user data for the first user.

The vehicle computer 110 can store, e.g., in a memory, user data for each of a plurality of potential users. The user data can keep track of authorized users, i.e., users that have permission to access the vehicle 105, and the user data can update over time as biometric data for the user changes, e.g., due to weight gain or loss, age, hair growth or loss, etc. User data includes biometric data for the respective user and a user authorization for the respective user. A user authorization, as used herein, specifies one or more vehicle 105 features that a user has permission to access and/or one or more operating parameters that a user has permission to control.

In the context of this document a "vehicle feature" is a setting of a vehicle component 125 that can be selected by user input, e.g., via the HMI 118. Non-limiting examples of vehicle 105 features include heating and/or cooling seats, climate control, e.g., in multiple zones or areas of the passenger cabin 200, heating a steering wheel, auto-dimming a rearview mirror, heating side mirrors, multi-color lighting, controlling a radio, controlling a moonroof, etc.

In the context of this document an "operating parameter" is an actual value of a measurement of a physical characteristic of a vehicle 105 or an environment around that vehicle 105 during vehicle operation. A variety of operating parameters may be determined during vehicle 105 operation. A non-limiting list of operating parameters includes a speed of the vehicle 105, a following distance between vehicles, a stopping location, an acceleration rate of the vehicle 105, a vehicle 105 destination, a vehicle 105 route, etc.

The vehicle computer 110 can actuate one or more sensor(s) 115 to obtain the enrollment biometric data for the first user. For example, the vehicle computer 110 can actuate sensor(s) 115 positioned to face the first user, e.g., when the first user is inside and/or outside of the passenger cabin 200. The vehicle computer 110 can actuate various sensors 115 to obtain corresponding types of biometric data. For example, the vehicle computer 110 can actuate an image sensor 115 to obtain image data including facial characteristics of the first user. Additionally, or alternatively, the vehicle computer 110 can actuate a capacitive touch sensor 115 to obtain data including a fingerprint of the first user. The vehicle computer 110 can, for example, validate biometric data by employing known watermarking techniques that encrypt data strings that indicate validity of the biometric data and include the encrypted data strings in the biometric data.

The vehicle computer 110 is programmed to biometrically authorize the first user based on first challenge biometric data for the first user and the user data. Challenge biometric data herein means biometric data obtained from a user in real-time or near real-time to compare to enrollment biometric data to perform biometric authorization for the user. Challenge biometric data is obtained after generation of the user data for the user based on the enrollment biometric data.

The first challenge biometric data can be obtained while the first user is outside the vehicle 105 (see FIG. 2). For example, the vehicle computer 110 may be programmed to obtain the first challenge biometric data based on detecting the first user outside the passenger cabin 200. The vehicle computer 110 can receive sensor 115 data, e.g., image data, LIDAR data, radar data, etc., of the environment around the vehicle 105. That is, the vehicle computer 110 can receive data from a sensor 115 positioned to face the environment, e.g., an external sensor 115*a*. The sensor 115 data can include one or more objects 205 around the vehicle 105. The vehicle computer 110 can monitor data from the external sensor 115*a* to detect an object 205 has moved into a field of view of the external sensor 115*a*. The vehicle computer 110 can identify the detected object 205 based on the sensor 115 data. For example, object identification techniques can be used, e.g., in the vehicle computer 110 based on LIDAR sensor 115 data, camera sensor 115 data, etc., to identify a type of object 205, e.g., a user, an animal, a vehicle, etc., as well as physical features of objects 205.

Any suitable techniques may be used to interpret sensor 115 data. For example, camera and/or LIDAR image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input vehicle sensor 115 data, e.g., an image, and then provide as output, for each of one or more respective regions of interest in the image, an identification of a user or an indication that no user is present in the respective region of interest. Further, a coordinate system (e.g., polar or cartesian) applied to an area proximate to the vehicle 105 can be applied to specify locations and/or areas (e.g., according to the vehicle 105 coordinate system, translated to global latitude and longitude geo-coordinates, etc.) of a user identified from sensor 115 data. Yet further, the vehicle computer 110 could employ various techniques for fusing (i.e., incorporating into a common coordinate system or frame of reference) data from different sensors 115 and/or types of sensors 115, e.g., LIDAR, radar, and/or optical camera data.

Upon identifying the type of object 205 as a type other than a user, the vehicle computer 110 can ignore the object 205. Upon identifying the type of object 205 as a user, the vehicle computer 110 obtains the first challenge biometric data for the first user. For example, the vehicle computer 110 can actuate sensor(s) 115 positioned to face the first user outside the vehicle 105, i.e., external sensors 115*a*. The vehicle computer 110 can actuate various sensors 115 to obtain corresponding types of biometric data, as discussed above.

Additionally, or alternatively, the first challenge biometric data can be obtained while the first user is inside the passenger cabin 200 (see FIG. 3). For example, the vehicle computer 110 may be programmed to obtain the first challenge biometric data based on detecting the first user inside the passenger cabin 200. For example, the vehicle computer 110 can receive sensor 115 data from a sensor 115 positioned to face the passenger cabin, e.g., an internal sensor 115*b*. The vehicle computer 110 can monitor data from the internal sensor 115*b* to detect an object 205 has moved into a field of view of the internal sensor 115*b*. The vehicle computer 110 can identify the detected object 205 based on the sensor 115 data, as discussed above.

Upon obtaining the first challenge biometric data for the first user, the vehicle computer 110 performs biometric authorization using the first challenge biometric data for the first user and the user data. Authorizing the first user means determining that the first user has permission to access the vehicle 105; a failure to authorize occurs upon a determination that the first user lacks permission to access the vehicle 105.

Biometric facial recognition is described herein as one non-limiting example of biometric authorization. Biometric facial recognition typically operates by calculating physiological characteristics of a human face and comparing the calculated physiological characteristics to stored physiological characteristics from the trained model. Physiological characteristics can include measures of facial features such as the distance between pupils, distance between corners of the mouth and length of nose, etc. These measures can be normalized by forming ratios of the measurements and stored as the trained model. At challenge time, an image of the human seeking access is acquired and processed to extract physiological characteristics which are then compared to stored physiological characteristics to determine a match. Other non-limiting examples of biometric authorization can include fingerprint recognition, eye recognition, voice recognition, etc.

Biometric authorization software can be executed on the vehicle computer 110 or the sensor 115 data, e.g., image data, can be uploaded to a remote server computer 140 that maintains a database of trained models for execution. An example of biometric authorization software is facial identification software, for example Face Tracker. Face Tracker is a facial recognition software library written in C++ and available on facetracker.net under the MIT software license.

Facial identification software can determine two sets of facial features corresponding to a challenge image and an enrollment image and determine ratios of distances between features. Facial identification software can determine a confidence score by determining a match value with previously determined facial identification features. A user status can be determined by comparing the confidence score to the first and second confidence thresholds, as discussed below.

Facial features include locations on a facial image such as inner and outer corners of the eyes and corners of the mouth. For example, facial feature detection routines such as SURF in the Dlib image processing library can determine locations on a face corresponding to facial features such as the center of each eye and the center of a mouth. The facial identification software can compare the ratios based on the two sets of features and determine a match value. If the ratios between sets of features match, meaning that they have the same value within an empirically determined tolerance, the person in the challenge image is determined to be the same person as in the previously acquired enrollment image.

The match value can be determined by determining a mean squared difference between the two sets of ratios. Matching the ratios of distances can reduce the variance in facial feature measurements caused by differences due to differences in distances from the camera and differences in poses between the two images.

The confidence score can be determined by multiplying the match value by a scalar constant that maps the match value to the interval (0,1), with values close to 1 corresponding to a good match and values close to 0 corresponding to a poor match. The scalar constant can be determined empirically by acquiring and testing a plurality of enrollment and challenge images.

Upon determining the confidence score for the first challenge biometric data, the vehicle computer 110 can determine a user status for the first user based on the confidence score. The user status is one of "authorized" or "not authorized," as set forth above. To determine the user status, the vehicle computer 110 compares the confidence score for the first challenge biometric data to the confidence threshold.

A confidence score greater than, i.e., exceeding, the confidence threshold can indicate that the first challenge biometric data is a good match for the enrollment biometric data, therefore the user status should be "authorized." A confidence score less than or equal to the confidence threshold can indicate that the first challenge biometric data did not match the enrollment biometric data, and therefore user status should be set to "not authorized." A confidence score less than or equal to the confidence threshold can indicate problems with the first challenge biometric data, e.g., an unauthorized user passed facial identification, or an authorized user failed facial identification.

Upon determining that the user status is "not authorized," the vehicle computer 110 can control vehicle 105 locks to prevent the first user from accessing the vehicle 105, e.g., the passenger cabin 200. Additionally, or alternatively, the vehicle computer 110 can prevent actuation of one or more vehicle components 125, e.g., so as to prevent operation of the vehicle 105 and/or adjustment of one or more vehicle 105 features. Additionally, or alternatively, the vehicle computer 110 can provide a message to one or more remote computers 140 specifying that an unauthorized user is attempting to access the vehicle 105.

Upon determining that the user status is "authorized," the vehicle computer 110 can control the vehicle 105 based on the user data for the first user, e.g., the user authorization. For example, the vehicle computer 110 can control vehicle 105 locks to permit the first user to access areas of the vehicle 105, e.g., a driver seat, a passenger seat, a rear seat, etc., specified by the user authorization. Additionally, the vehicle computer 110 can actuate one or more vehicle components 125 to operate the vehicle 105 to satisfy the operating parameters specified by the user authorization. As another example, the vehicle computer 110 can actuate one or more vehicle components 125 to adjust one or more vehicle 105 features specified by the user authorization.

While operating the vehicle 105 based on the user data for the first user, the vehicle computer 110 can receive sensor 115 data, e.g., image data, LIDAR data, radar data, etc., of the passenger cabin 200. That is, the vehicle computer 110 can receive data from a sensor 115 positioned to face the passenger cabin 200, e.g., an internal sensor 115b. The vehicle computer 110 can determine a presence or an absence of the first user in the passenger cabin 200 based on the sensor 115 data, e.g., by using object identification techniques and biometric authorization techniques discussed above. Upon determining the presence of the first user in the passenger cabin 200 (see FIG. 3), the vehicle computer 110 can continue to operate the vehicle 105 based on the user data for the first user.

The vehicle computer 110 is programmed to initiate a first timer based on determining the absence of the first user in the passenger cabin 200. As one example, the vehicle computer 110 can initiate the first timer upon detecting the absence of the first user. As another example, the vehicle computer 110 can initiate the first timer upon detecting a vehicle door closing after detecting the absence of the first user. As yet another example, the vehicle computer 110 can initiate the first timer based on detecting a vehicle door opening. In such an example, the vehicle computer 110 can reset the first timer based on determining the presence of the first user in the passenger cabin 200. A duration of the first timer may be a predetermined amount of time, e.g., determined empirically based on testing that allows for determining a minimum amount of time within which a user is not expected to return to the vehicle after departing the vehicle.

In addition to initiating the first timer, the vehicle computer 110 is programmed to determine whether a second user entered the passenger cabin 200. The vehicle computer 110 can, for example, detect the second user entered the passenger cabin 200 based on data from the internal sensor(s) 115b, as discussed above. For example, the vehicle computer 110 can monitor data from the internal sensor 115b to detect that the second user has moved into a field of view of the internal sensor 115b. If the vehicle computer 110 does not detect the second user in the passenger cabin 200 prior to expiration of the timer, then the vehicle computer 110 does not delay biometric authorization for the second user (as discussed below). In the present context, a "second user" is a user attempting to access the vehicle 105 after departure by the first user. The second user may, for example, be the first user, i.e., the first user may return to the vehicle 105. As another example, the second user may be a different user than the first user.

If the vehicle computer 110 detects the second user in the passenger cabin 200 prior to expiration of the first timer, then the vehicle computer 110 delays biometric authorization for the second user. Upon determining to delay biometric authorization for the second user, the vehicle computer 110 determines whether a delay parameter is satisfied. A "delay parameter" is an actual value of a measurement of a physical quantity of vehicle operation while the second user is inside the passenger cabin 200. A delay parameter is satisfied when the actual value of the measurement of the physical quantity is greater than or equal to a threshold of the physical quantity.

As one example, the delay parameter may be a distance traveled by the vehicle 105. In such an example, upon detecting the second user in the passenger cabin 200, the vehicle computer 110 can determine a location of the vehicle 105 when the second user was permitted access to the vehicle 105. For example, the vehicle computer 110 may receive a location of the vehicle 105, e.g., from a sensor 115, a navigation system, a remote server computer 140, etc. Additionally, the vehicle computer 110 can determine a current location of the vehicle 105, e.g., in the same manner as just discussed. The vehicle computer 110 can then determine a distance between the current location of the vehicle 105 and the location of the vehicle 105 when the second user was permitted access to the vehicle 105, e.g., by comparing respective geo-coordinates. The location of the vehicle 105 when the second user was permitted access to the vehicle 105 may also be referred to as a "previous location."

Upon determining the distance, the vehicle computer 110 can compare the distance to a threshold. The threshold may be stored, e.g., in a memory of the vehicle computer 110. The threshold may be determined empirically, e.g., based on testing that allows for determining a minimum distance travelled by the vehicle beyond which the first user is unlikely to return to the vehicle 105. If the distance is greater than the threshold, then the vehicle computer 110 can determine that the delay parameter is satisfied. If the distance is less than or equal to the threshold, then the vehicle computer 110 can determine that the delay parameter is not satisfied.

As another example, the delay parameter may be an amount of time. In such an example, the vehicle computer 110 can determine that the delay parameter is satisfied based on expiration of a second timer. The vehicle computer 110 can initiate the second timer upon detecting the second user in the passenger cabin 200. A duration of the second timer can be a predetermined amount of time, e.g., determined empirically based on testing that allows for determining an average amount of time for a vehicle to travel a distance equal to the threshold. If the second timer is not expired, then the vehicle computer 110 can determine that the delay parameter is not satisfied. If the second timer is expired, then the vehicle computer 110 can determine that the delay parameter is satisfied.

Upon determining that the delay parameter is not satisfied, the vehicle computer 110 can operate the vehicle 105 based on temporary user data. The temporary user data may be stored, e.g., in a memory of the vehicle computer 110. The temporary user data may be specified by a vehicle owner, an authorized user, a vehicle 105 and/or component 125 manufacturer, etc., to permit limited access to (i.e., access to some but not all features of) the vehicle 105, e.g., to allow the second user to operate the vehicle but prevent the second user from initiating biometric enrollment and/or adjusting vehicle 105 features.

Upon determining that the delay parameter is satisfied, the vehicle computer 110 can obtain second challenge data for the second user. The vehicle computer 110 can obtain the second challenge biometric data in substantially the same manner as discussed above regarding obtaining the first challenge biometric data. Alternatively, prior to determining that the delay parameter is satisfied, the vehicle computer 110 can authenticate the second user (as discussed below). In this situation, the vehicle computer 110 can obtain second challenge data for the second user upon authenticating the second user.

Upon obtaining the second challenge biometric data, the vehicle computer 110 can be programmed to biometrically authorize the second user based on the second challenge biometric data. That is, the vehicle computer 110 can perform biometric authorization using the second challenge biometric data and user data. Alternatively, the vehicle computer 110 can obtain the second challenge biometric data upon detecting the second user in the vehicle cabin 200. In this situation, the vehicle computer 110 can biometrically authorize the second user upon determining that the delay parameter is satisfied.

The vehicle computer 110 can determine a confidence score for the second challenge biometric data, e.g., as discussed above regarding determining a confidence score for the first challenge biometric data. The vehicle computer 110 can then compare the confidence score for the second challenge biometric data to the confidence threshold. If the confidence score for the second challenge biometric data exceeds the confidence threshold, then the vehicle computer 110 can determine that the user status for the second user is "authorized." In this situation, the vehicle computer 110 can control the vehicle 105 based on the user data for the second user, as discussed above.

If the confidence score for the second challenge biometric data is less than or equal to the confidence threshold, then the vehicle computer 110 can determine that the user status for the second user is "not authorized." In this situation, the vehicle computer 110 can determine whether the first user (or another authorized user) is in the passenger cabin 200. For example, after departing the vehicle 105, the first user may enter the passenger cabin 200, e.g., through a different door, and occupy a seat other than the seat that the first user previously occupied, e.g., prior to departing the vehicle 105. The vehicle computer 110 can detect another user in the passenger cabin 200 with the second user, e.g., based on internal sensor 115*b* data, as discussed above. If the vehicle computer 110 detects another user in the passenger cabin 200, then the vehicle computer 110 can biometrically authorize the other user, as discussed above. Upon determining, via biometric authorization, that the other user is an authorized user, e.g., the first user, the vehicle computer 110 can operate the vehicle 105 based on the user data for the authorized user, e.g., the first user.

If the vehicle computer 110 determines that another authorized user, e.g., the first user, is not in the passenger cabin 200, then the vehicle computer 110 can stop operating the vehicle 105 based on the temporary user data. For example, the vehicle computer 110 can operate the vehicle 105 to a stop and prevent further actuation of one or more vehicle components 125, as discussed above. Additionally, or alternatively, the vehicle computer 110 can provide a message to one or more remote computers 140 specifying that an unauthorized user has accessed the vehicle 105.

Additionally, or alternatively, the vehicle computer 110 can authenticate the second user upon determining that the second user is "not authorized." For example, the vehicle computer 110 can authenticate the second user based on receiving a third user input specifying identifying information for the second user, e.g., a username and a password. As one example, the vehicle computer 110 can actuate the HMI 118 to detect the second user pressing virtual buttons to specify the second user's identifying information, as discussed above. As another example, the third user input may be a vocal input. In this situation, the vehicle computer 110 may obtain audio data specifying the identifying information via a microphone, and be programmed to determine the third user input, e.g., by using data processing techniques, such as Natural Language Processing.

Upon detecting the third user input, the HMI 118 can provide the third user input to the vehicle computer 110. The vehicle computer 110 can then, for example, provide the third user input to the remote server computer 140. The remote server computer 140 can authenticate the second user, e.g., based on a look-up table or the like associating the second user with the identifying information specified by the third user input. The remote server computer 140 can then provide an authentication status to the vehicle computer 110 specifying that the second user is "authenticated" or "not authenticated." If the second user is "authenticated," then the vehicle computer 110 can continue to operate the vehicle 105 based on the temporary user data.

If the second user is "not authenticated," then the vehicle computer 110 can stop operating the vehicle 105 based on the temporary user data, as discussed above. Additionally, or alternatively, the vehicle computer 110 can operate the vehicle 105 based on unauthorized user data. The unauthorized user data may be stored, e.g., in the memory of the vehicle computer 110. The unauthorized user data may be specified by a vehicle owner, an authorized user, a vehicle 105 and/or component 125 manufacturer, etc. to prevent or deter further operation of the vehicle 105 by an unauthorized user. For example, the unauthorized user data may instruct the vehicle computer 110 to prevent the unauthorized user from operating the vehicle 105, operate the vehicle 105 to a predetermined location (e.g., adjacent to a law enforcement building), actuate vehicle components 125 to output a false alert indicating that one or more vehicle components 125 is operating outside of a desirable operation range (e.g., specified by a vehicle 105 and/or component 125 manufacturer), actuate vehicle components 125, e.g., lights, speakers, a horn, etc., to output an alarm, control locks, latches, and windows to prevent the unauthorized user from exiting the passenger cabin 200, etc.

Additionally, or alternatively, the unauthorized user data (and/or the temporary user data) may instruct the vehicle computer 110 to provide, to the remote server computer 140, the current location of the vehicle 105 and/or a previous location. For example, the vehicle computer 110 can transmit the current location and/or the previous location of the vehicle 105 to the remote server computer 140, e.g., via the network 135. In such an example, the remote server computer 140 can then instruct, e.g., via the network 135, another vehicle to operate to the current location and/or the previous location of the vehicle 105.

Upon failing to determine that a second user entered the passenger cabin 200 prior to expiration of the first timer, the vehicle computer 110 is programmed to not delay biometric authorization for the second user. That is, the vehicle computer 110 performs biometric authorization for a second user upon detecting the second user approaching the vehicle 105 and/or inside the passenger cabin 200, as discussed above. In other words, the vehicle computer 110 can ignore the delay parameter. The vehicle computer 110 then controls access to the vehicle 105 based on the biometric authorization for the second user. That is, after expiration of the first timer, the vehicle computer 110 prevents unauthorized users from accessing the vehicle 105 and permits authorized user to access the vehicle 105 according to user data associated with the authorized user, as discussed above.

Figure 4:
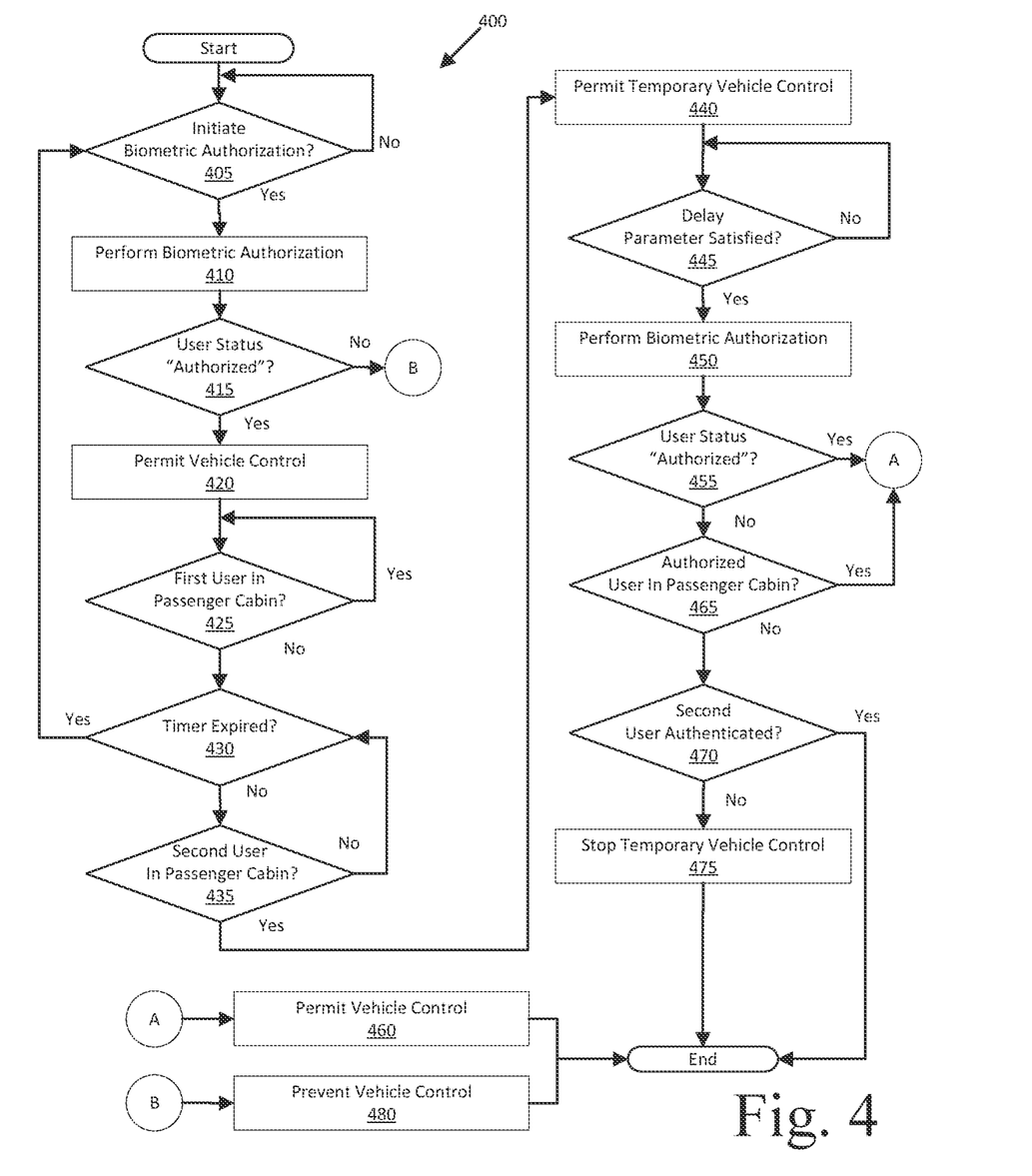
FIG. 4 is a flowchart of an example process for delaying biometric authorization for a user.

FIG. 4 is a diagram of an example process 400 executed in a vehicle computer 110 according to program instructions stored in a memory thereof for delaying biometric authorization for a user. Process 400 includes multiple blocks that can be executed in the illustrated order. Process 400 could alternatively or additionally include fewer blocks or can include the blocks executed in different orders.

Process 400 begins in a block 405. In the block 405, the vehicle computer 110 determines whether to initiate biometric authorization. The vehicle computer 110 can initiate biometric authorization based on detecting, via sensor 115 data, a first user approaching the vehicle 105 and/or inside a passenger cabin 200 of the vehicle 105, as discussed above. If the vehicle computer 110 determines to initiate biometric authorization, then the process 400 continues in a block 410. Otherwise, the process 400 remains in the block 405.

In the block 410, the vehicle computer 110 performs biometric authorization using first challenge biometric data for the first user, as discussed above. The vehicle computer 110 actuates one or more sensors 115 to obtain the first challenge biometric data for the first user, as discussed above. The vehicle computer 110 determines a confidence score for the first challenge biometric data by performing biometric authorization, as discussed above. The process 400 continues in a block 415.

In the block 415, the vehicle computer 110 determines whether a user status for the first user is "authorized." To determine whether the user status is "authorized," the vehicle computer 110 compares the confidence score for the first challenge biometric data to a confidence threshold, as discussed above. If the confidence score for the first challenge biometric data is greater than or equal to the confidence threshold, then the vehicle computer 110 determines that the user status is "authorized." In this situation, the process 400 continues in a block 420. Otherwise, the process 400 continues in a block 480.

In the block 420, the vehicle computer 110 controls one or more vehicle components 125 based on the user data for the first user, as discussed above. The process 400 continues in a block 425.

In the block 425, the vehicle computer 110 determines whether the first user is in the passenger cabin 200 of the vehicle 105. The vehicle computer 110 can determine the first user is in the passenger cabin 200 based on data from internal sensors 115b, as discussed above. If the vehicle computer 110 determines that the first user is in the passenger cabin 200, then the process 400 remains in the block 425. Otherwise, the process 400 continues in a block 430.

In the block 430, the vehicle computer 110 determines whether a first timer has expired. As set forth above, the vehicle computer 110 can initiate the first timer upon detecting an absence of the first user in the passenger cabin 200. If the first timer has expired, then the process 400 returns to the block 405. Otherwise, the process 400 continues in a block 435.

In the block 435, the vehicle computer 110 determines whether a second user is in the passenger cabin 200 of the vehicle 105. The second user can be a same or different user as the first user, as discussed above. The vehicle computer 110 can determine the second user is in the passenger cabin 200 based on data from internal sensors 115b, as discussed above. If the vehicle computer 110 determines that the second user is in the passenger cabin 200, then the process 400 continues in a block 440. Otherwise, the process 400 returns to the block 430.

In the block 440, the vehicle computer 110 controls one or more vehicle components 125 based on temporary user data, as discussed above. The process 400 continues in a block 445.

In the block 445, the vehicle computer 110 determines whether a delay parameter is satisfied. As set forth above, the vehicle computer 110 can determine that the delay parameter is satisfied based on an actual value of a measurement of a physical quantity of vehicle operation exceeding a threshold the physical quantity. If the delay parameter is not satisfied, then the process 400 remains in the block 445. Otherwise, the process 400 continues in a block 450.

In the block 450, the vehicle computer 110 performs biometric authorization using second challenge biometric data for the second user, as discussed above. The block 450 is substantially identical to the block 410 of the process 400 therefore will not be described further to avoid redundancy. The process 400 continues in a block 455.

In the block 455, the vehicle computer 110 determines whether a user status for the second user is "authorized." The block 455 is substantially identical to the block 415 of the process 400 therefore will not be described further to avoid redundancy. If the vehicle computer 110 determines that the second user is "authorized", then the process 400 continues in a block 460. Otherwise, the process 400 continues in a block 465.

In the block 460, the vehicle computer 110 controls one or more vehicle components 125 based on the user data for the second user (or another authorized user), as discussed above. The process 400 ends following the block 460.

In the block 465, the vehicle computer 110 determines whether the first user (or another authorized user) is inside the passenger cabin 200. The vehicle computer 110 can detect other users inside the passenger cabin 200 based on data from the internal sensors 115b, as discussed above. The vehicle computer 110 can then biometrically authorize the detected users, as discussed above. If the vehicle computer 110 determines that the first user (or another authorized user) is inside the passenger cabin 200, then the process 400 continues in the block 460. Otherwise, the process 400 continues in a block 470.

In the block 470, the vehicle computer 110 determines whether the second user is authenticated. The vehicle computer 110 can authenticate the second user based on, e.g., identifying information for the user, as discussed above. If the vehicle computer 110 authenticates the second user, then the process 400 ends following the block 470. Otherwise, the process 400 continues in a block 475.

In the block 475, the vehicle computer 110 stops operating the vehicle 105 based on the temporary user data, as discussed above. The vehicle computer 110 can operate the vehicle 105 based on unauthorized user data, as discussed above. The process 400 ends following the block 475.

In the block 480, the vehicle computer 110 prevents the user from controlling and/or accessing the vehicle 105, as discussed above. The process 400 ends following the block 480.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor programmed to:
    upon determining a first user of an object is authorized via first biometric data, control object components based on user data for the first user;
    permit a second user to access the object based on detecting a presence of the second user within a predetermined time of detecting an absence of the first user;
    then, upon determining a delay parameter is satisfied, determine a user status of the second user via second biometric data, wherein the user status is one of authorized or not authorized;
    control the object components based on the user status of the second user; and
    upon determining that the second user is not authorized, provide, to a remote computer, a current location of the object and a location of the object when the second user accessed to the object.

2. The system of claim 1, wherein the instructions further include instructions to, upon determining the delay parameter is not satisfied, control the object components based on temporary user data.

3. The system of claim 2, wherein the instructions further include instructions to, upon determining that the second user is not authorized, stop controlling the object components based on the temporary user data.

4. The system of claim 1, wherein the instructions further include instructions to, upon determining that the second user is authorized, control the object components based on user data for the second user.

5. The system of claim 1, wherein the instructions further include instructions to, upon determining that the second user is not authorized, prevent operation of the object components.

6. The system of claim 1, wherein the instructions further include instructions to, upon determining that the second user is not authorized, control the object components based on unauthorized user data.

7. The system of claim 1, wherein the instructions further include instructions to, upon detecting the first user after determining the delay parameter is satisfied, control the object components based on the user data for the first user when the user status for the second user is not authorized.

8. The system of claim 1, wherein the instructions further include instructions to determine that the delay parameter is satisfied based on expiration of a timer.

9. The system of claim 1, wherein the instructions further include instructions to determine that the delay parameter is satisfied based on determining a distance from a current location of the object to a location of the object when the second user was permitted access to the object exceeds a threshold.

10. The system of claim 1, wherein the instructions further include instructions to, upon detecting the presence of the second user after the predetermined time, ignore the delay parameter and determine the user status of the second user via the second biometric data.

11. The system of claim 10, wherein the instructions further include instructions to, upon determining that the user status for the second user is authorized, permit the second user to access the object.

12. The system of claim 11, wherein the instructions further include instructions to control the object components based on user data for the second user.

13. The system of claim 1, wherein the instructions further include instructions to determine that the first user is authorized based on a confidence score for the first biometric data being greater than or equal to a confidence threshold.

14. The system of claim 1, wherein the instructions further include instructions to determine that the second user is authorized based on a confidence score for the second biometric data being greater than or equal to a confidence threshold.

15. A method, comprising:
- upon determining a first user of an object is authorized via first biometric data, controlling object components based on user data for the first user;
- permitting a second user to access the object based on detecting a presence of the second user within a predetermined time of detecting an absence of the first user;
- then, upon determining a delay parameter is satisfied, determining a user status of the second user via second biometric data, wherein the user status is one of authorized or not authorized;
- controlling the object components based on the user status of the second user; and
- upon determining the delay parameter is not satisfied, controlling the object components based on temporary user data.

16. The method of claim 15, further comprising, upon determining that the second user is not authorized, stopping control of the object components based on the temporary user data.

17. The method of claim 15, further comprising determining that the delay parameter is satisfied based on expiration of a timer.

18. The method of claim 15, further comprising determining that the delay parameter is satisfied based on determining a distance from a current location of the object to a location of the object when the second user was permitted access to the object exceeds a threshold.

19. A system, comprising a computer including a processor and a memory, the memory storing instructions executable by the processor programmed to:
- upon determining a first user of an object is authorized via first biometric data, control object components based on user data for the first user;
- permit a second user to access the object based on detecting a presence of the second user within a predetermined time of detecting an absence of the first user;
- then, upon determining a delay parameter is satisfied, determine a user status of the second user via second biometric data, wherein the user status is one of authorized or not authorized;
- control the object components based on the user status of the second user;
- upon detecting the first user after determining the delay parameter is satisfied, control the object components based on the user data for the first user when the user status for the second user is not authorized.

20. The system of claim 19, wherein the instructions further include instructions to determine that the delay parameter is satisfied based on determining a distance from a current location of the object to a location of the object when the second user was permitted access to the object exceeds a threshold.

* * * * *